April 2, 1929.  J. J. OPREMCHAK  1,707,363
ADJUSTABLE LEG
Filed April 23, 1928
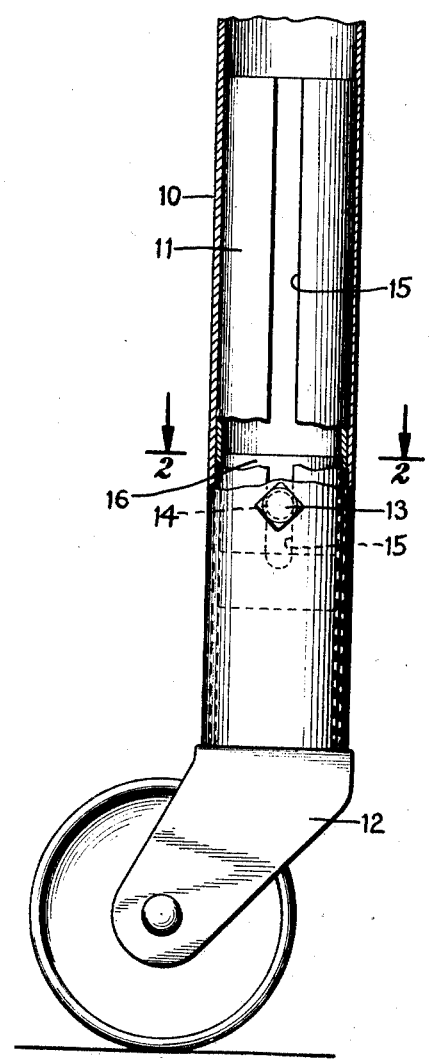
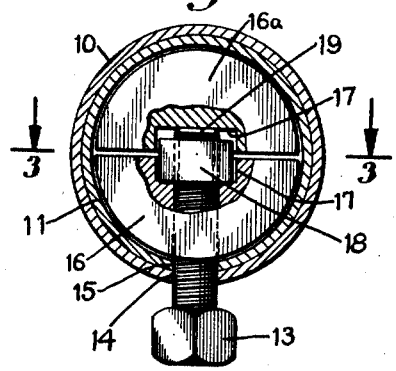
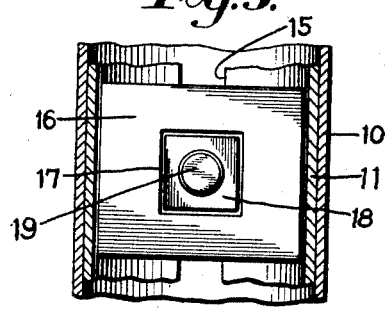
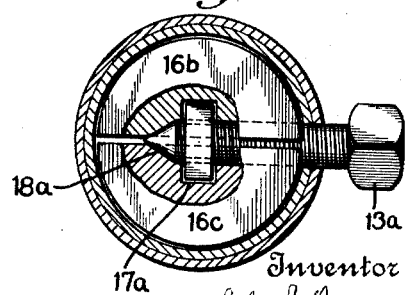
Inventor
John J. Opremchak
By his Attorneys
Cooper, Kerr & Dunham Patented Apr. 2, 1929.

1,707,363

UNITED STATES PATENT OFFICE.

JOHN J. OPREMCHAK, OF SCHENECTADY, NEW YORK, ASSIGNOR TO L. E. CASS, INC., OF SCHENECTADY, NEW YORK, A CORPORATION OF NEW YORK.

ADJUSTABLE LEG.

Application filed April 23, 1928. Serial No. 272,233.

This invention relates to the provision of improved means for adjustably fastening and clamping a member within a tubular sheet metal leg to provide for adjustability of the height of the leg.

A further object resides in the provision of an interior clamping means adapted to be disposed within a leg and to spread a sleeve-like member into clamping cooperation with the tubular leg upon the adjustment of a member which projects through and outside of the tubular leg.

Further and other objects will be hereinafter set forth in the accompanying specification and claims and shown in the drawings, which show several embodiments of the invention.

In the drawings:

Figure 1 is an elevational view of a tubular leg incorporating my improvements.

Fig. 2 is a cross-sectional view taken substantially on line 2—2 of Fig. 1.

Fig. 3 is a detail sectional view taken substantially on line 3—3 of Fig. 2.

Fig. 4 is a detail cross-sectional view of a modification.

In more detail in the drawings, 10 is the outer tubular leg member within which it is desired to adjustably and telescopically support a member 11, which is adapted to carry a suitable caster or other part at its foot as indicated at 12. In order to permit clamping member 11 at various relative vertical positions with respect to member 10 and obviate the possible binding of the parts which would render it difficult to make subsequent vertical adjustments the following clamping devices are provided.

A conventional set screw 13 passes through an opening 14 in the outer tubular leg 10. The shank of this set screw likewise passes through a vertical slot 15 which is formed in the inner sleeve-like member 11. Disposed within the sleeve-like member are a plurality of clamping parts, two such parts being here shown and respectively designated 16 and $16^a$ (see Fig. 2). These parts are substantially semi-circular and are each provided with a recess 17 adapted to receive a nut 18, so as to prevent its rotation upon adjustment of the set screw. When it is desired to clamp the member 11 at any desired vertical position with respect to 10, the set screw 13 is first backed off so that the tip or end portion 19 of the set screw is out of abutting contact with the member $16^a$. The parts 16 and $16^a$ are now relatively loose within the sleeve member 11 and this sleeve can be freely adjusted with respect to the outer tubular leg to any desired vertical position. After proper vertical adjustment is made the set screw 13 is tightened causing the nut 18 and the tip 19 of the set screw to spread parts 16 and $16^a$ apart, thereby spreading the sleeve 11 and clamping it firmly to the tubular leg.

According to the modification shown in Fig. 4, a nut engaging recess $17^a$ is likewise provided but at the end of the set screw $13^a$ it is shown tapered as at $18^a$. This acts as a spreader to spread apart the two clamping members $16^b$ and $16^c$.

By the foregoing clamping devices, a telescopic member may be clamped within a metal leg at any desired point and the means for clamping do not cause any marring of the parts which might interfere with subsequent telescopic adjustment.

What I claim is:

1. A clamping means for interiorly clamping a sleeve-like member within a tubular leg comprising a pair of clamping members disposed within the sleeve-like member and means projecting without the tubular leg for spreading said parts apart and for thereby clamping the sleeve-like member to the tubular leg.

2. A clamping means for interiorly clamping a sleeve-like member within a tubular leg comprising a pair of clamping members disposed within the sleeve-like member and having portions thereof shaped to receive a nut and prevent its rotation, a set screw extending without the tubular leg and having a threaded portion to engage the aforesaid nut whereby said parts may be spread apart for clamping the sleeve to the leg or allowed to be loosened to permit adjustment of said sleeve and leg.

3. A tubular leg having a sleeve within the same vertically adjustable with respect thereto, means for clamping and unclamping said sleeve with respect to said leg, said means comprising clamping members within said sleeve, a set screw extending through the tubular leg and having a shank portion extending through a slot in said sleeve, said shank portion having threads thereon and a nut upon said threads and restrained against rotation by the clamping members, said nut and set screw upon the rotation of the latter being adapted to spread the clamping members apart and clamp the sleeve to the tubular leg by spreading the former in the latter.

In testimony whereof I hereto affix my signature.

JOHN J. OPREMCHAK.